United States Patent
Satomi et al.

(10) Patent No.: US 9,591,183 B2
(45) Date of Patent: Mar. 7, 2017

(54) IMAGE FORMING APPARATUS AND IMAGE FORMING METHOD THAT CAN PRINT CONCEALABLE CHARACTERS IN A PARTICULAR COLOR

(71) Applicant: KYOCERA Document Solutions Inc., Osaka (JP)

(72) Inventors: Seiki Satomi, Osaka (JP); Masataka Takemura, Osaka (JP); Shinji Hayashi, Osaka (JP); Kunihiko Tanaka, Osaka (JP); Hiroshi Yokota, Osaka (JP); Masaki Miyashita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/926,932

(22) Filed: Oct. 29, 2015

(65) Prior Publication Data

US 2016/0127612 A1 May 5, 2016

(30) Foreign Application Priority Data

Oct. 31, 2014 (JP) .................. 2014-222677

(51) Int. Cl.
*G06K 15/00* (2006.01)
*H04N 1/44* (2006.01)
(Continued)

(52) U.S. Cl.
CPC ......... *H04N 1/4493* (2013.01); *H04N 1/0657* (2013.01); *H04N 1/32309* (2013.01); *H04N 1/32352* (2013.01); *H04N 2201/0094* (2013.01)

(58) Field of Classification Search
None
See application file for complete search history.

(56) References Cited

U.S. PATENT DOCUMENTS 6,169,815 B1 * 1/2001 Aoki ................ H04N 1/60
382/100
6,229,914 B1 * 5/2001 Hiraishi ............. H04N 1/00843
382/162
(Continued)

FOREIGN PATENT DOCUMENTS

JP H6-121146 A 4/1994
JP 2007-110453 A 4/2007
(Continued)

OTHER PUBLICATIONS

Yoshihara et al., JP2011-071661 A, Image Forming Apparatus, Control Method, and Program, Jul. 4, 2011, English Translation, par 0012, 0016-0017, 0020, (provided by applicant on Sep. 6, 2016).*
(Continued)

*Primary Examiner* — Miya J Cato
(74) *Attorney, Agent, or Firm* — Stein IP, LLC (57) ABSTRACT

An image forming apparatus has a sheet reading portion, an assimilation surveying portion, a color changing portion, and a printing portion. The sheet reading portion reads image data from a transparent sheet tinted with a predetermined color owned by a user. The assimilation surveying portion looks for, out of printable colors, a particular color that assimilates to the color of the read image data. The color changing portion changes, out of the data of a predetermined document accepted from the user, the color of the data of a concealable character, which is a character concealed when overlaid with the transparent sheet, to the found particular color. The printing portion prints, out of the data of the document, the data of the concealable character in the particular color.

3 Claims, 5 Drawing Sheets (51) Int. Cl.
*H04N 1/06* (2006.01)
*H04N 1/32* (2006.01)

(56) References Cited

U.S. PATENT DOCUMENTS

| | | | | |
|---|---|---|---|---|
| 2003/0076540 | A1* | 4/2003 | Hamashima | B41M 3/146 358/3.28 |
| 2005/0258633 | A1* | 11/2005 | Hilicki | G09B 11/00 283/63.1 |
| 2007/0177168 | A1* | 8/2007 | Nakazawa | G03G 15/0131 358/1.4 |
| 2007/0248364 | A1* | 10/2007 | Wicker | B42D 25/29 399/1 |
| 2012/0263379 | A1* | 10/2012 | Bhatti | H04N 1/6033 382/167 |
| 2014/0198983 | A1* | 7/2014 | Moroney | G01J 3/463 382/165 |

FOREIGN PATENT DOCUMENTS

| | | |
|---|---|---|
| JP | 2007-166339 A | 6/2007 |
| JP | 2010-114503 A | 5/2010 |
| JP | 2011-71661 A | 4/2011 |
| JP | 2011071661 A * | 4/2011 |

OTHER PUBLICATIONS

Japanese Office Action dated Aug. 9, 2016, issued by the Japanese Patent Office in corresponding application JP 2014-222677.

* cited by examiner

IMAGE FORMING APPARATUS AND IMAGE FORMING METHOD THAT CAN PRINT CONCEALABLE CHARACTERS IN A PARTICULAR COLOR

INCORPORATION BY REFERENCE

This application is based upon and claims the benefit of priority from the corresponding Japanese Patent Application No. 2014-222677 filed on Oct. 31, 2014, the entire contents of which are incorporated herein by reference.

BACKGROUND

The present disclosure relates to an image forming apparatus and an image forming method.

A method of studying is known in which a printed document having question text printed in black and answer text printed in a predetermined color (such as red or green) is overlaid with a transparent sheet of a color corresponding to the color of the answer text so as to conceal only the answer text. For image forming apparatuses such as multifunction peripherals, copiers, and printers, there have been developed a variety of technologies to cope with that method of studying.

For example, with a known image forming apparatus, a user can, by marking places to be concealed on a document, easily create question text, in which places to be concealed are painted out, and answer text, which shows the concealed places. With another known image forming apparatus, confidential parts of a printed document can be concealed, and targets to be concealed are discriminated by checking the color of characters. With yet another known image forming apparatus, within a document, markers of a color different from that of the document are arranged, and inside the regions specified by the markers, image processing that suits a user's purpose is performed. With a further known image forming apparatus, according to the hue of markers within an image, image processing that suits a user's purpose is performed.

SUMMARY

According to one aspect of the present disclosure, an image forming apparatus includes a sheet reading portion, an assimilation surveying portion, a color changing portion, and a printing portion. The sheet reading portion reads image data from a transparent sheet tinted with a predetermined color owned by a user. The assimilation surveying portion looks for, out of printable colors, a particular color that assimilates to the color of the read image data. The color changing portion changes, out of the data of a predetermined document accepted from the user, the color of the data of a concealable character, which is a character concealed when overlaid with the transparent sheet, to the found particular color. The printing portion prints, out of the data of the document, the data of the concealable character in the particular color.

According to another aspect of the present disclosure, an image forming method includes a sheet reading step, an assimilation surveying step, a color changing step, and a printing step. In the sheet reading step, image data is read from a transparent sheet tinted with a predetermined color owned by a user. In the assimilation surveying step, out of printable colors, a particular color is looked for that assimilates to the color of the image data read from the transparent sheet. In the color changing step, out of the data of a predetermined document accepted from the user, the color of the data of a concealable character, which is a character concealed when overlaid with the transparent sheet, is changed to the found particular color. In the printing step, out of the data of the document, the data of the concealable character is printed in the particular color.

Further features and advantages of the present disclosure will become apparent from the description of embodiments given below.

DETAILED DESCRIPTION

Hereinafter, with reference to the accompanying drawings, an embodiment of an image forming apparatus and an image forming method according to the present disclosure will be described for a clear understanding of the present disclosure. The embodiment presented below is merely one example of how the present disclosure can be implemented, and is not meant to limit the technical scope of the present disclosure in any way. In flow charts, the letter "S" preceding a number stands for "step".

As one example of how the present disclosure can be implemented, an image forming apparatus will be described below. An image forming apparatus according to the present disclosure can be, for example, a multifunction peripheral 100 (MFP) provided with the functions of a facsimile machine, a copier, a scanner, a printer. etc.

Figure 1:
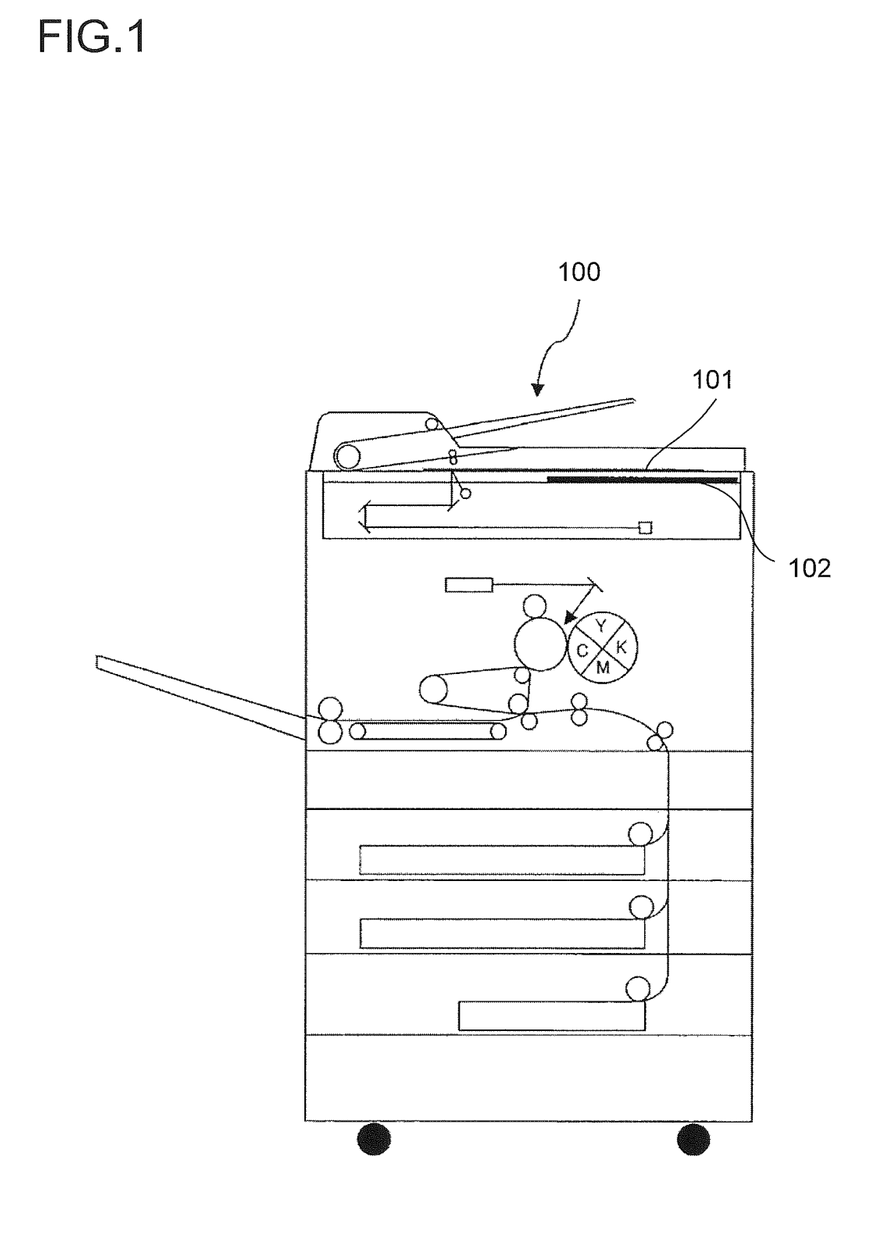
FIG. 1 is a conceptual diagram showing an overall internal configuration of a multifunction peripheral according to the present disclosure.

As shown in FIG. 1, on accepting setting conditions for a print job from a user via an operation portion 102 including a touch panel (unillustrated), the multifunction peripheral 100 drives its constituent blocks, such as an image reading portion, an image processing portion, a transfer portion, and a fixing portion, to accomplish the print job. The multifunction peripheral 100 is capable of color printing.

The multifunction peripheral 100 has control circuitry in which, though unillustrated, a CPU (central processing unit), a ROM (read only memory), a RAM (random access memory), a HDD (hard disk drive), and drivers for different driven portions are connected together via an internal bus.

The CPU of the multifunction peripheral 100, for example, uses the RAM as a working area, executes programs stored in the ROM, HDD, etc., receives data, instructions, signal, commands, etc. from the drivers based on the results of program execution, and controls the operation of the different driven portions with respect to the execution of a print job. The CPU also realizes portions (see FIG. 2) other than the driven portions, i.e., portions which will be described below, by executing corresponding programs. In the ROM, RAM, HDD, etc., there are stored programs and data for realizing the different portions described below.

Figure 2:
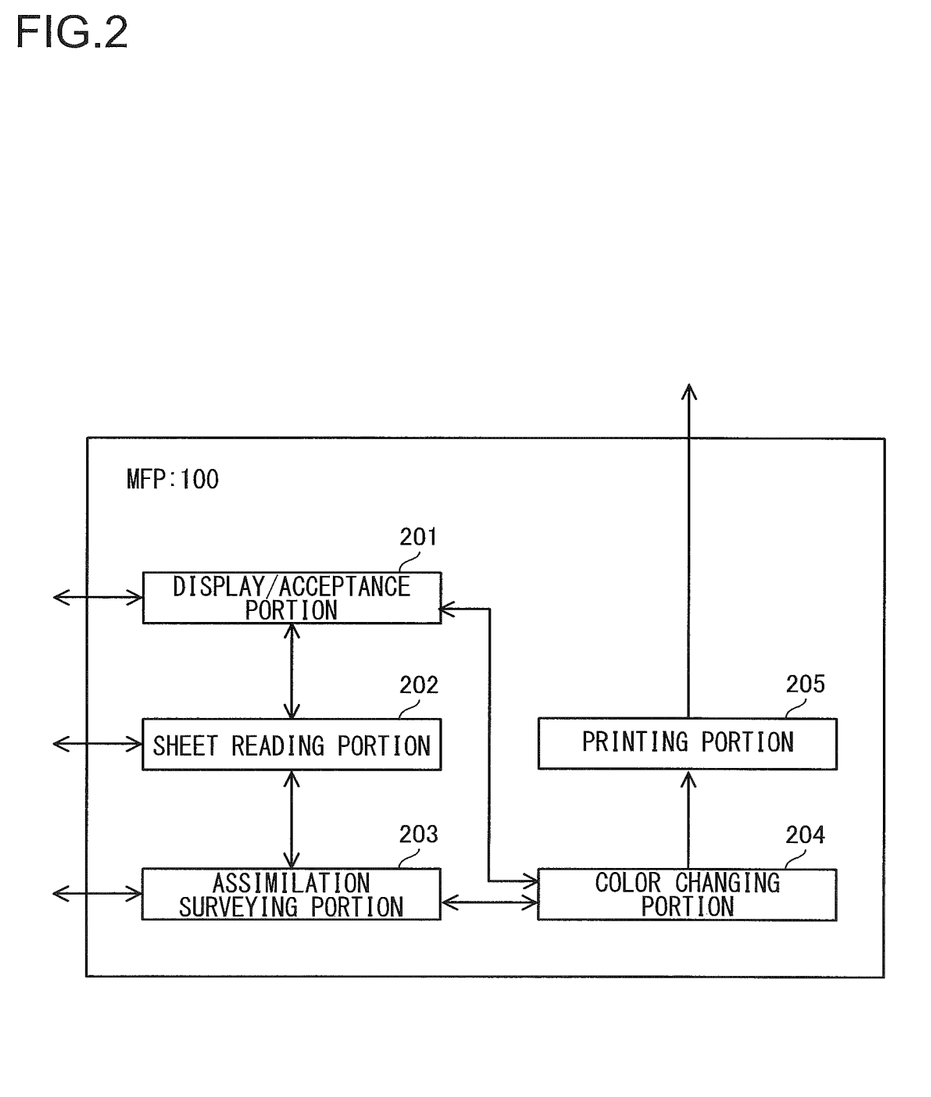
FIG. 2 is a functional block diagram of a multifunction peripheral according to one embodiment of the present disclosure.

Next, with reference to FIGS. 2 and 3, a configuration and an execution procedure according to one embodiment of the present disclosure will be described. When a user turns on the power to the multifunction peripheral 100, a display/acceptance portion 201 of the multifunction peripheral 100 displays an operation screen (unillustrated) on a touch panel and accepts instructions from the user.

Figure 3:
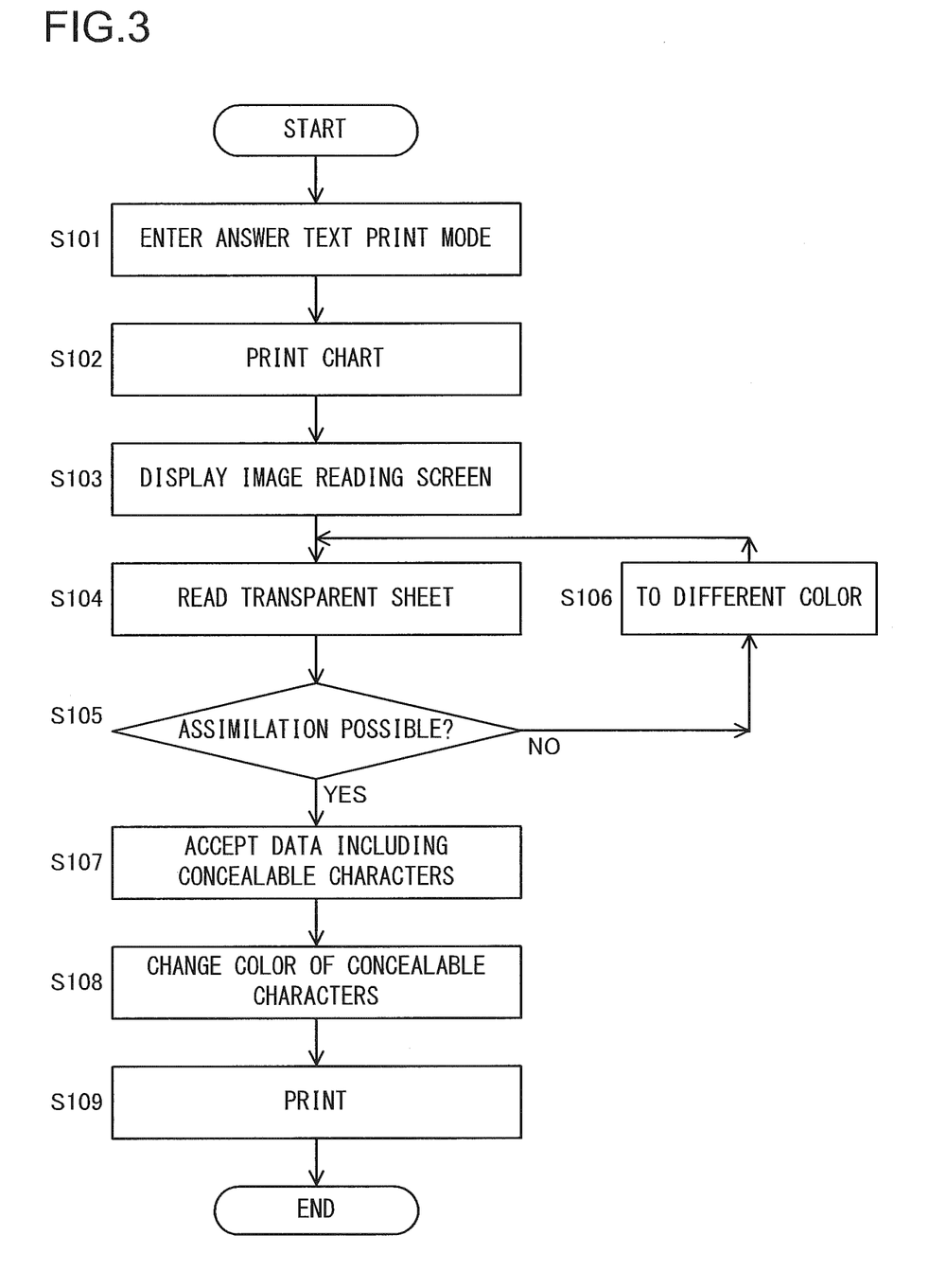
FIG. 3 is a flow chart showing an execution procedure according to one embodiment of the present disclosure.

When the user, viewing the operation screen, selects an answer text print key (unillustrated), then the display/acceptance portion 201, in response to the selection of the answer text print key, enters an answer text print mode (FIG. 3, S101).

When the display/acceptance portion 201 enters the answer text print mode, a sheet reading portion 202 is notified accordingly. So notified, the sheet reading portion 202 reads image data 403 (see FIG. 4B) from a transparent sheet 401 (see FIG. 4B) tinted with a predetermined color that is owned by the user.

Figure 4A:
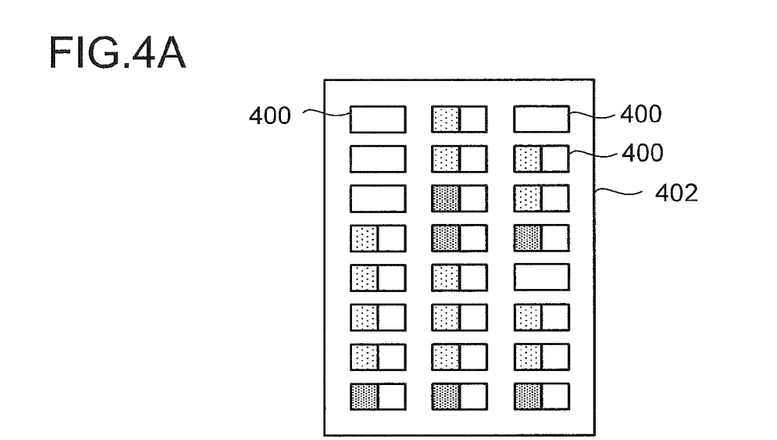
FIG. 4A is a chart according to one embodiment of the present disclosure.
Figure 4B:
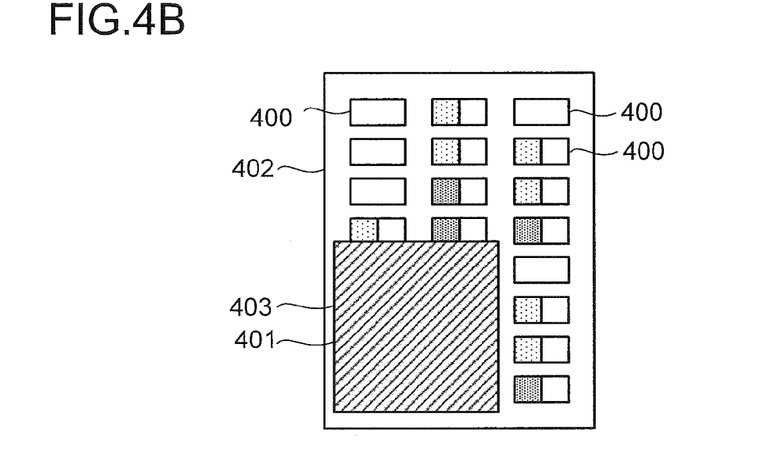
FIG. 4B is a diagram showing an example of a transparent sheet laid over a chart according to one embodiment of the present disclosure.

Here, there is no particular limitation on the method by which the sheet reading portion 202 reads the image data. For example, the sheet reading portion 202 refers to a plurality of color patches 400 of different colors that are previously stored in a predetermined memory. As shown in FIG. 4A, the color patches 400 are patches of different colors (hues) within the range of colors in which the multifunction peripheral 100 can print. In a case where the multifunction peripheral 100 is a color printing apparatus, the colors of the color patches 400 are colors that can be printed as combinations of yellow (Y), cyan (C), magenta (M), and black (K). The colors of the color patches 400 shown in FIG. 4A are yellow, red, violet, indigo, blue, and green. For certain colors (e.g., yellow), a plurality of different degrees of lightness are selected and included in the color patches 400. The lightness of the color patches 400 shown in FIG. 4A varies gradually from light to dark, with four different degrees of lightness for each color. Based on the plurality of color patches 400, the sheet reading portion 202 first outputs, as a printout of color reference, a chart 402 of the color patches 400 of different colors as shown in FIG. 4A (FIG. 3, S102).

Here, when the sheet reading portion 202 outputs the chart 402, identification numbers (see FIG. 4C; in this embodiment, numbers starting at "01") for identifying the individual color patches 400 are placed inside or near the respective color patches 400 in the chart 402. In this embodiment, the identification numbers are placed inside the color patches 400.

Next, the sheet reading portion 202 invites the user to lay the transparent sheet 401 over a chart 402 with color patches 400 whose colors are close to the color of the transparent sheet 401, and displays on the touch panel an image reading screen prompting image reading in that state (FIG. 3, S103). Seeing the image reading screen, the user lays the transparent sheet 401 over a chart 402 with color patches 400 whose colors are close to the color (e.g., red) of the transparent sheet 401. This done, the user then places them on a document stage 101 of the multifunction peripheral 100, with the transparent sheet 401 facing the platen glass of the document stage 101 and with the chart 402 on the reverse side of the transparent sheet 401, and selects an image reading key. Then the sheet reading portion 202, in response to the selection of the image reading key, reads image data of the transparent sheet 401 on the document stage 101 in a state laid over the plurality of color patches 400 on the chart 402 (FIG. 3, S104, a sheet reading step). In this way, image data 403 of the transparent sheet 401 is obtained along with image data of the color patches 400 whose colors are close to the color of the transparent sheet 401.

When the sheet reading portion 202 completes image reading, an assimilation surveying portion 203 is notified accordingly. So notified, the assimilation surveying portion 203 looks for, out of printable colors, a particular color that assimilates to the color of the read image data 403 of the transparent sheet 401 (i.e., out of the colors of the color patches 400, one similar to the color of the transparent sheet 401) (FIG. 3, S105, an assimilation surveying step).

Figure 4C:
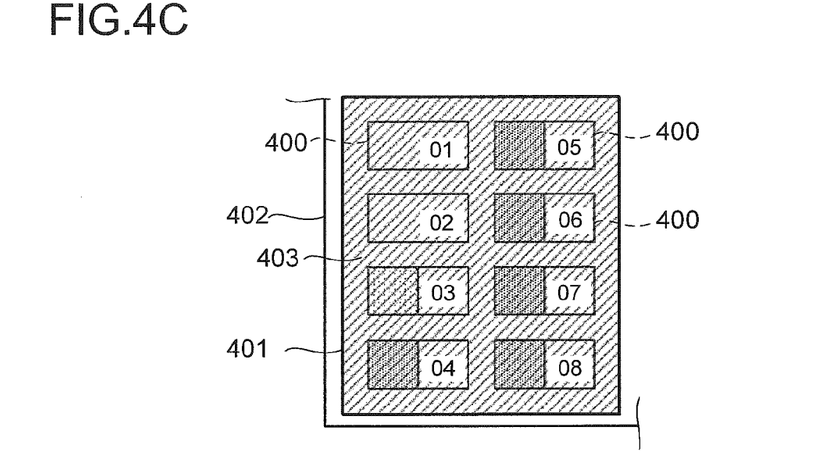
FIG. 4C is a diagram showing one example of the image data of a transparent sheet in a state laid over a chart according to one embodiment of the present disclosure.

Here, there is no particular limitation on the method by which the assimilation surveying portion 203 looks for a color. For example, as shown in FIG. 4C, the assimilation surveying portion 203 checks whether or not, out of the previously read image data 403 of the transparent sheet 401, the color of the transparent sheet 401 is similar to the color of each of the color patches 400 in a state overlaid with the transparent sheet 401 (the color patches 400 on the reverse side of the transparent sheet 401) (in FIG. 4C, checks are done with respect to identification numbers 01 to 08). A check of whether or not the color of the transparent sheet 401 is similar to the color of each of the color patches 400 is achieved, for example, by comparing the pixel value of the former with the pixel value of the latter to check whether or not those values are equal. The check can instead be whether or not those values are close within a range of a predetermined threshold value.

Here, as shown in FIG. 4C, out of the colors of the color patches 400, those judged to be similar to the color of the transparent sheet 401 are the colors of the patches identified by identification numbers "01" and "02" out of "01" to "08". In a case where, as here, two or more of the colors of the color patches 400 are found to be similar to the color of the transparent sheet 401, the assimilation surveying portion 203 looks for the one with the lowest lightness (darkest) among them. This makes it easier to recognize concealable characters that a user printed without the tinted transparent sheet 401 laid over.

If the survey results in finding that, with respect to the read image data of the transparent sheet 401 and the color patches 400, there is none among the color patches 400 which has a particular color that assimilates to the color of the image data 403 of the transparent sheet 401 (FIG. 3, S105, NO), what takes place subsequently is as follows. The assimilation surveying portion 203 invites the user to move the transparent sheet 401 to over a chart 402 with color patches 400 whose colors differ from those of the color patches 400 over which the transparent sheet 401 is currently laid, and then, with the transparent sheet 401 moved to over the new chart 402, once again displays on the touch panel the image reading screen prompting image reading (FIG. 3, S106). Thus, the user can once again look for, out of the color patches 400, one having a color that assimilates to the color of the transparent sheet 401.

In a case where the transparent sheet 401 is smaller in size than the chart 402, image reading can instead be performed in the following manner. The sheet reading portion 202 identifies, in the read image data of the transparent sheet 401 and the color patches 400, the outline of the transparent sheet 401. Then, if a particular color is not found inside the identified outline of the transparent sheet 401 (if none of the colors of the color patches 400 is identical with the color of the transparent sheet 401), an image re-reading retry screen can be displayed. It can thus be clearly indicated that the particular color is not among the colors of the color patches 400 over which the transparent sheet 401 is currently laid, and this permits the user to recognize that he needs to move the transparent sheet 401 to over the color patches 400 of other colors. Here, even if none of the colors of the color patches 400 is found to be identical with the color of the transparent sheet 401, if any is found to have a pixel value close enough or close within a range of a predetermined threshold value, the user can be invited to shorten the distance over which the transparent sheet 401 is moved. For example, in a case where the colors on the chart 402 vary little by little, shortening the distance over which the transparent sheet 401 is moved makes it easy to find a color patch 400 with a color that is identical with the color of the transparent sheet 401. In this way, when the color patches 400 is likely to include one with a color that assimilates to the color of the transparent sheet 401, it is possible to reduce the burden on the user of moving the transparent sheet 401.

Seeing the image re-reading screen, the user moves the transparent sheet 401 to over the color patches 400 of other colors. This done, the user then places them on a document stage 101 of the multifunction peripheral 100, with the transparent sheet 401 facing the platen glass of the document stage 101 and with the chart 402 on the reverse side of the transparent sheet 401, and selects an image reading key. Then, back at S104, the sheet reading portion 202 reads image data of the transparent sheet 401 and the chart 402 on the document stage 101 (FIG. 3, S104). When the sheet reading portion 202 completes image reading, then as described above, the assimilation surveying portion 203 looks for a particular color that assimilates to the color of the read image data 403 of the transparent sheet 401 (FIG. 3, S105).

On the other hand, if, at S105, the survey results in finding that one particular color assimilates to the color of the read image data 403 of the transparent sheet 401 (FIG. 3, S105, YES), the assimilation surveying portion 203 notifies a color changing portion 204 accordingly. So notified, the color changing portion 204 accepts data 500 of a predetermined document (see FIG. 5A) from the user (FIG. 3, S107) as will be described in detail later. Then the color changing portion 204 changes, out of the data 500 of the accepted document, the color of data 501 (see FIG. 5A) of concealable characters which are concealed when overlaid with the transparent sheet 401 (FIG. 3, S108, a color changing step).

There is no particular limitation on the method by which the color changing portion 204 changes the data 500 of a document to be changed. According to one changing method, for example, the color changing portion 204 displays on the touch panel a document input screen prompting input of data 500 of a document including concealable characters. Seeing the document input screen, the user prepares the data 500 of a previously created document. The data 500 of the document includes data 502 of question text in ordinary characters, which are not concealed when overlaid with the transparent sheet 401, and data 501 of answer text in concealable characters. The data 500 of the document is fed to the multifunction peripheral 100 by use of, for example, a storage medium such as a USB memory. Then the color changing portion 204 accepts the data 500 of the document including concealable characters (FIG. 3, S107).

The data 500 of a document including concealable characters can be accepted in any manner other than as described above: for example, a user can transmit to the multifunction peripheral 100 the data 500 of a document that the user created on a terminal device connected to the multifunction peripheral 100 via a network; a user can have image data read from a document including concealable characters on paper; the data 500 of a document including concealable characters that is stored in a document box of the multifunction peripheral 100 can be read out.

Figure 5A:
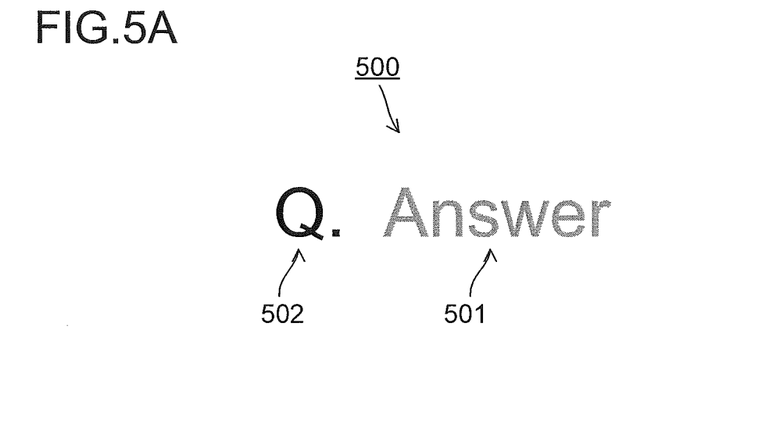
FIG. 5A is a diagram showing an example of a state before the color of concealable characters is changed.
Figure 5B:
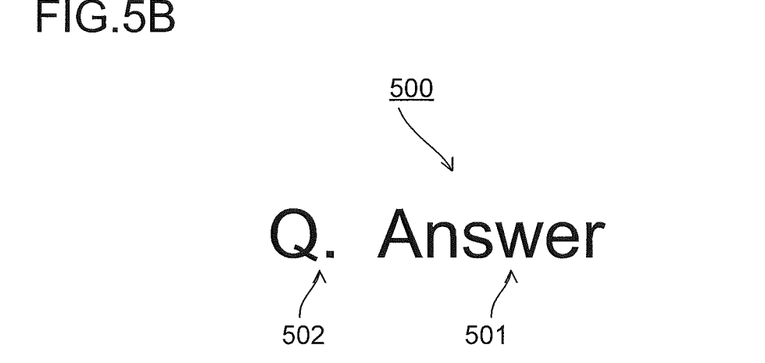
FIG. 5B is a diagram showing an example of a state after the color of concealable characters is changed.

On accepting the data 500 of the document, the color changing portion 204 changes, out of the data 500 of the document, the color of the data 501 of concealable characters to the found particular color (FIG. 3, S108). Here, to permit the color changing portion 204 to identify a given part of the data 500 of the document as data 501 of concealable characters, for example, a user can, when creating the data 500 of the document, mark the data 501 of concealable characters with identification information indicating that they are concealable characters, or the color changing portion 204 can show the data 500 of a document to a user to allow him to specify concealable characters. In this embodiment, as shown in FIG. 5A, out of the data 500 of the document, only the color (red) of the data 501 of concealable characters ("Answer") set by a predetermined method is changed to the found particular color (darker red). The color of the data 502 of ordinary characters ("Q.") is not changed.

When the color changing portion 204 completes the changing of the color of the data 501 of concealable characters, a printing portion 205 is notified accordingly. So notified, the printing portion 205 prints, out of the data 500 of the document, the data 501 of concealable characters in the particular color reflecting the change (FIG. 3, S109, a printing step). In this way, concealable characters can be printed in a color that assimilates to the color of the transparent sheet 401; thus, when the concealable characters are overlaid with the transparent sheet 401, they can be concealed with no unnatural effect. The color of concealable characters is adjusted on the part of the multifunction peripheral 100, and this saves the user trouble by eliminating color adjustment by trial and error. This is especially suitable for the printing of a document in which question text and answer text (concealable characters) are mixed.

Here, the printing portion 205 applies high lines-per-inch screening to the concealable characters (or to the data 501 of the concealable characters). This permits the concealable characters to be printed in fine segments so that, when overlaid with the transparent sheet 401, they are still less visible.

Figure 5C:
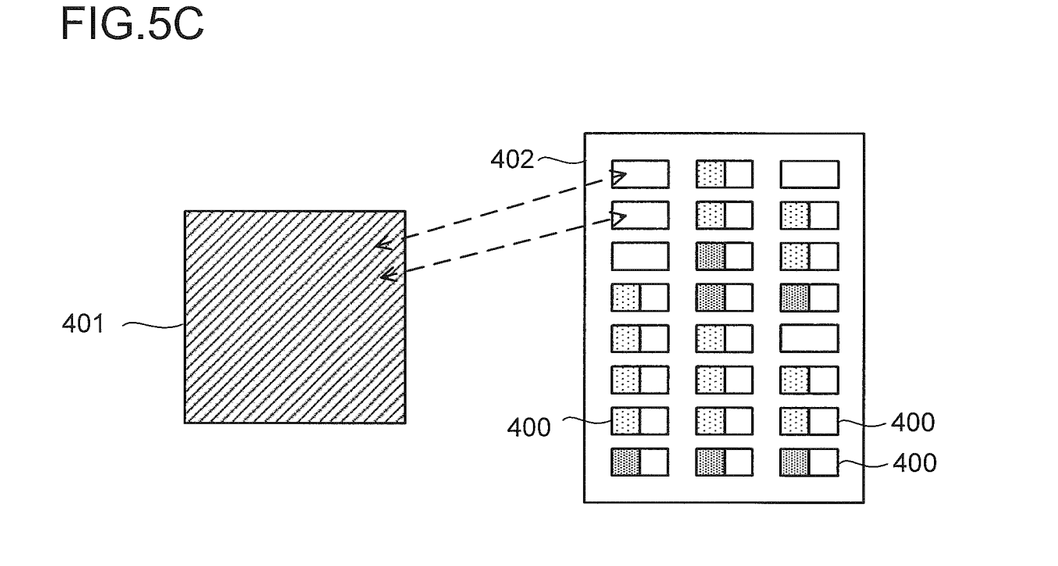
FIG. 5C is a diagram showing an example of comparison of the color of a transparent sheet with the colors of color patches on a chart as performed on internal data of a multifunction peripheral according to one embodiment of the present disclosure.

The above description deals with a configuration where the sheet reading portion 202 prints a chart 402 and then reads, with a transparent sheet 401 laid over the chart 402, image data including the transparent sheet 401. With this configuration, based on the colors of the color patches 400 on the chart 402 actually printed by the multifunction peripheral 100, a particular color that assimilates to the color of the transparent sheet 401 is looked for. This results in the advantage that laying the transparent sheet 401 over the printed document reliably conceals concealable characters. However, on the disadvantageous side, the printing of the chart 402 consumes extra paper and extra toner which are wasted. This can be avoided by, for example as shown in FIG. 5C, letting the sheet reading portion 202 read only the image data 403 of the transparent sheet 401. Then the assimilation surveying portion 203 reads out, from a predetermined memory of the multifunction peripheral 100, the data of color patches 400 of different colors on the chart 402. Then, on the data (by data processing using a program within the multifunction peripheral 100), the color of the image data 403 of the transparent sheet 401 can be compared with that of each of the color patches 400 of different colors to look for, out of the latter, a particular color that is identical with the former. With this configuration, while concealable characters can be made invisible with less reliability, there is no need to print the chart 402.

The embodiment of the present disclosure described above deals with a configuration where the multifunction peripheral 100 is provided with different portions; instead, it is also possible to provide a recording medium (unillustrated) on which programs for realizing those portions are stored. With this configuration, the programs are read out by the multifunction peripheral 100, which thereby realizes the corresponding portions. In that case, the programs read out from the recording medium themselves provide the workings and effects according to the present disclosure. It is also possible to provide the steps to be executed by different functional blocks in a form stored on a hard disk.

What is claimed is:

1. An image forming apparatus comprising:
   a sheet reading portion configured to read, by referring to a plurality of color patches of different colors previously stored in a predetermined memory, image data from a transparent sheet tinted with a predetermined color owned by a user;
   an assimilation surveying portion configured to look for, out of printable colors, a particular color that assimilates to a color of the image data read from the transparent sheet and to identify a color similar to a color of the transparent sheet from the plurality of color patches;
   a color changing portion including a document input screen which accepts data of a predetermined document from the user, the color changing portion being configured to change, out of data of a predetermined document accepted from the user via the document input screen, a color of data of a concealable character, which is a character concealed when overlaid with the transparent sheet, to the found particular color; and
   a printing portion configured to print, out of the data of the document, the data of the concealable character a color which is in changed the particular color and which assimilates to the color of the transparent sheet,
   wherein
   the sheet reading portion is configured to
      print a chart with color patches of different colors within a range of printable colors, and
      display an image reading screen inviting the user to perform image reading with the transparent sheet laid over a chart with color patches of colors close to the color of the transparent sheet, in order to read image data of the transparent sheet in a state laid over the color patches on the chart, and
   the assimilation surveying portion is configured to judge whether or not, out of the read image data, the color of the transparent sheet is similar to a color of a color patch overlaid with the transparent sheet;
   wherein the sheet reading portion is configured to identify, out of the read image data, an outline of the transparent sheet, and when the particular color is not found inside the identified outline of the transparent sheet,
   displays the image reading screen once again to invite the user to perform image reading with the transparent sheet moved to over a chart with color patches of colors different from the colors of the color patches over which the transparent sheet is currently laid, in order to read image data of the transparent sheet in a state laid over the color patches of the different colors.

2. The image forming apparatus of claim 1, wherein the printing portion applies high lines-per-inch screening to the concealable character.

3. An image forming method comprising:
   reading, by referring to a plurality of color patches of different colors previously stored in a predetermined memory, image data from a transparent sheet tinted with a predetermined color owned by a user, printing a chart with color patches of different colors within a range of printable colors, and displaying to the user an image reading screen inviting the user to perform image reading with the transparent sheet laid over a chart with color patches of colors close to a color of the transparent sheet, in order to read image data of the transparent sheet in a state laid over the color patches on the chart;
   looking for, out of printable colors, a particular color that assimilates to a color of the image data read from the transparent sheet and identifying a color similar to the color of the transparent sheet from the plurality of color patches, looking for the particular color by judging whether or not, out of the read image data, the color of the transparent sheet is similar to a color of a color patch overlaid with the transparent sheet;
   on accepting, via a document input screen which accepts data of a predetermined document from the user, the predetermined document from the user,
   changing, out of data of the accepted predetermined document, a color of data of a concealable character, which is a character concealed when overlaid with the transparent sheet, to the found particular color; and
   printing, out of the data of the document, the data of the concealable character in a color which is the changed particular color and which assimilates to the color of the transparent sheet,
   wherein the sheet reading portion is configured to identify, out of the read image data, an outline of the transparent sheet, and when the particular color is not found inside the identified outline of the transparent sheet,
   displays the image reading screen once again to invite the user to perform image reading with the transparent sheet moved to over a chart with color patches of colors different from the colors of the color patches over which the transparent sheet is currently laid, in order to read image data of the transparent sheet in a state laid over the color patches of the different colors.

* * * * *